ERROR - CHECKING DEVICE FOR ACCOUNTING MACHINES
Filed Nov. 24, 1954
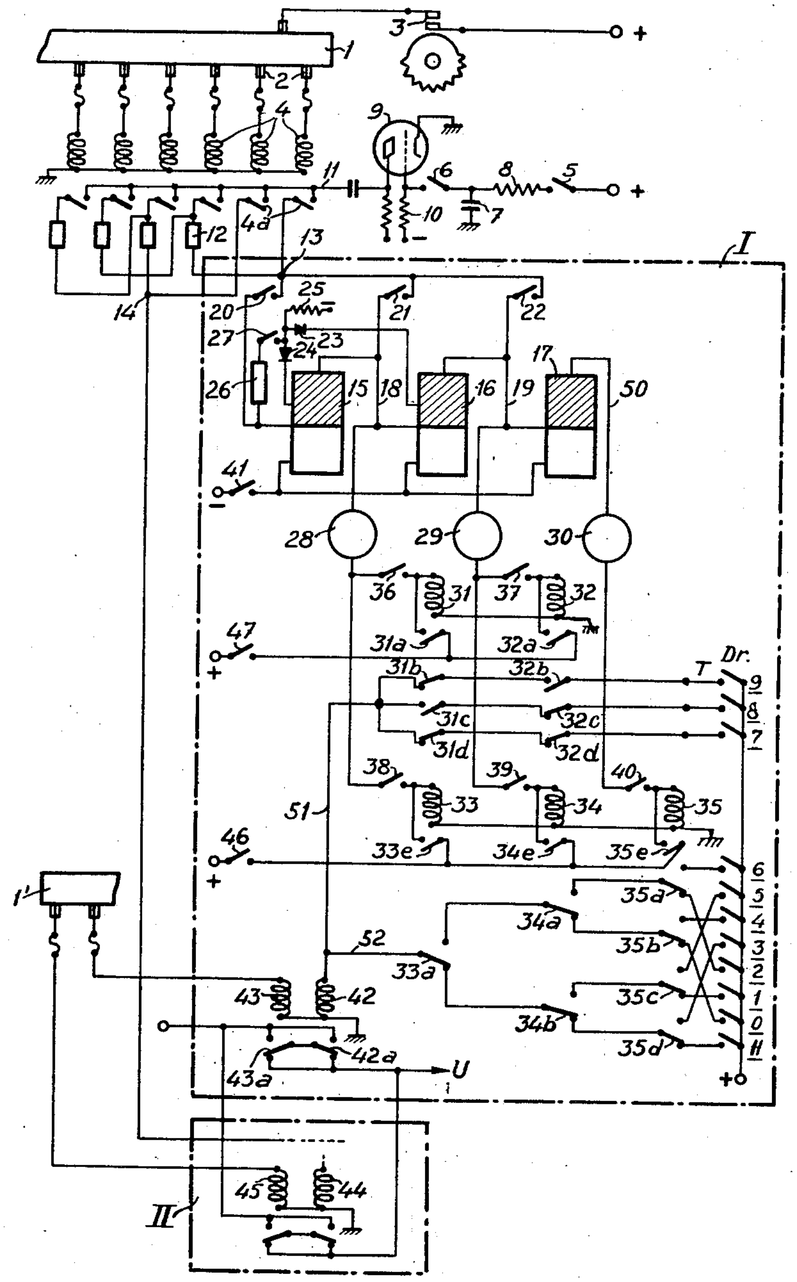

2,814,439
Patented Nov. 26, 1957

2,814,439

ERROR-CHECKING DEVICE FOR ACCOUNTING MACHINES

Raymond Henry Elie Marie Béranger, Paris, France, assignor to Compagnie des Machines Bull (Societe Anonyme), Paris, France Application November 24, 1954, Serial No. 470,903

Claims priority, application France November 27, 1953

4 Claims. (Cl. 235—61.6)

The invention relates to a system for checking errors in accounting machines, in which there is provided, in addition to the datum of which it is desired to check the entry on the record card or tape, a checking indication which is related to the figures of the datum.

In order to ascertain the type of checking which may be effected in this manner, reference may be had, for example, to U. S. patent application filed October 17, 1950, Serial No. 190,507, now Patent No. 2,759,669, according to which a column is reserved on the card or tape for the entry of a mark characteristic of a sign which imparts to the complete number formed by the combination of the figures of the numerical datum and of the additional characteristic sign a simple arithmetical property, which is always the same and which the accounting machine verifies by means specially provided for this purpose. The said characteristic sign is called the "checking symbol."

One of the simple arithmetical properties which lend themselves best to such a checking is divisibility of the said number by eleven. However, it nevertheless necessitates a somewhat complex special arrangement for alternately adding and subtracting the successive figures of the datum.

In accordance with the invention, it is possible to employ a checking arrangement for an operation of punching the symbol or an operation of checking the entry of the number and of the symbol which performs only additions, by virtue of a particular arrangement of the checking indication which, in the present case, is that corresponding to the said symbol according to the aforesaid patent application.

To this end, it is proposed in accordance with the invention that the registration of the checking indication should take place, not in one column, but in a number of columns, and preferably in two or in three columns, that is to say, it should comprise a number of checking symbols.

It will first be assumed by way of example that the checking is to take place with two symbols, and that the entry of the datum 153,732,486 is to be checked.

In accordance with the principle of the invention, the figures of even order and the figures of uneven order in the datum are separately added and the totalisation is effected without any carry-over over a suitable base. Assuming, for example, that the totalisation is effected on the base 10 and if the symbol obtained on the figures of even order is called $Sp$ and that obtained on the figures of uneven order is called $Si$, the result will be as follows:

$$Sp=6+4+3+3+1-10=7$$
$$Si=8+2+7+5-10=2$$

The "complete" number, will be, for example 153,732,486,72

It is clear that with such a checking system it is possible to detect errors due to the inversion of two consecutive figures in the entry. If, as an example of inversion, the datum is erroneously entered as 153,723,486, the result is:

$$Sp=6+4+2+3+1-10=6$$
$$Si=8+3+7+5-10=3$$

which shows that the two symbols are simultaneously altered.

Moreover, an isolated error on a single figure is immediately detected from the variation of one of the symbols. In addition, errors of over-entry or under-entry (simultaneous increase or decrease of two consecutive figures of one quantity) are revealed by a modification of equal value of the two symbols. Thus, the modifications undergone by the symbols permit of detecting the nature of the error in the entry of the data, which was not the case with the process according to the aforesaid patent application. The detection of the nature of the error in the entry and the detection in the errors of over-entry or under-entry are two advantageous results of the present invention.

If three symbols S, S′, S″ are employed, three separate additions of the various figures of the datum, taken in threes, will similarly be effected. With the aforesaid numerical example, we have:

$$S\ =6+2+3-10=1$$
$$S'\ =8+3+5-10=6$$
$$S''=4+7+1-10=2$$

It is not possible with the process according to the present invention to detect inversions of figures with a single computing device as in the aforesaid patent application, but if a number of computing devices are employed, each for a separate group of columns, the columns of each of these groups alternating one by one on the card in a predetermined order, any inversion will be detected for two or more columns and not only for two columns as in the aforesaid patent application.

All of the aforesaid advantageous differences form the principal object of the present invention.

Moreover, the invention is applicable to the checking of alphabetical symbols and of mixed data containing both figures and letters, as in the U. S. patent application filed January 24, 1951, Serial No. 207,555, now Patent No. 2,765,982, but it is to be noted that the devices described in this patent application utilise only one column for the checking symbol and analyse the columns of the card in series, while the present invention effects this analysis in parallel. In this connection, it will be recalled that an alphabetical code of the usual type is supplied by the following table:

*Table I*

| | 11 | 0 | 1 | 2 | 3 | 4 | 5 | 6 | : | |
|---|---|---|---|---|---|---|---|---|---|---|
| 7 | A | B | C | D | E | F | G | H | : | 0 |
| 8 | J | K | L | M | N | P | Q | R | : | 1 |
| 9 | S | T | U | V | W | X | Y | Z | : | 2 |
| | 0 | 1 | 2 | 3 | 4 | 5 | 6 | 7 | : | |

that is to say, that an A is represented by the combination of an 11 and of a 7, a B by an 0 and a 7, etc., these figures being those written on the first horizontal line and on the left-hand vertical column. Each letter may be represented when considering the corresponding figures written below the horizontal line and to the right of the dotted vertical line, by the combination of a figure used on the base 8 and another figure used on the base 3. If, for example, the datum WAG 4810 is considered, it is equivalent in accordance with the latter correspondence to the following two lines of figures:

$$\frac{4065021}{2000100}$$

so that there are two letter-symbols for which:

$$Sp = 2+5+0=7$$
$$S'p = 0+0+0=0$$
$$Si = 1+0+6+4-8=3$$
$$S'i = 1+2-3=0$$

These symbols will therefore be H and D in accordance with the foregoing table.

In order to check alphabetical indications, which is also one of the objects of the present invention, it could be necessary to have two accumulating members acting on the base 8 and two accumulating members acting on the base 3, but as will be shown by means of an example illustrating the embodiment of the invention, it is possible, by adapting them to operate successively, to reduce the number of accumulators to two members or even to one member.

The invention thus also has for its object to provide a device for checking mixed data which is based on the principle and the table of correspondence hereinbefore referred to, and which is diagrammatically illustrated in the accompanying drawing. In this case, in relation with the other cases hereinbefore mentioned, the device hereinafter described for the application of the invention permit the use of a letter in each of the columns containing one checking symbol, that is to say, two marks per column in accordance with the code given by way of example, this being another object of the present invention. According to the aforesaid U. S. patent application Serial No. 190,507 only a figure is employed and in accordance with the U. S. patent application No. 207,555 mentioned only a letter is employed, always in one column. Further objects will become apparent from the practical examples hereinafter described with reference to the accompanying drawing.

The device illustrated in the drawing comprises, in addition to the members particularly adapted to the said practical example, members usual in automatic accounting machines. These are the members 1, 2, 3 and 4 for sensing the record cards or tapes and the comparison members 42, 43, 44 and 45, the latter determining the method of operation of the machines according to the positions of contacts such as 42*a* and 43*a*. Contacts D*r* are also provided, each of which closes for each separate index point in the columns of a record card and supplies a positive impulse. These contacts are distributed in two groups 9, 8, 7 and 6, 5, 4, 3, 2, 1, 0, 11 in accordance with the code of the index points corresponding to the machine points of the present example. Finally, other contacts of the said machines are adapted to operate in accordance with the process of the present invention, the closures of these contacts being controlled by an appropriate setting of a number of rotating cams in these machines. These contacts are the contacts 6, 5, 20, 21, 22, 27, 41, 36, 37, 47, 38, 39, 40 and 46.

It is obvious that these members could be employed independently of the said machines by any person skilled in the art of these machines in order to provide an independent device, which is also an object of the invention.

The accompanying drawing is a diagram illustrating the principle of error-checking circuits operating in two sensing cycles and verifying the conformity of a registered datum (letters of figures, or letters and figures) and of two checking symbols each recorded in the form of two marks (a letter according to the code employed) in each of the two columns reserved for the recording of these symbols.

In Figure 1, there is shown at 1 a roller for driving the cards of the accounting machine, which cards pass under brushes 2 (assuming that the checking is effected on six columns for the sake of simplicity, there are six brushes). A cam contact 3 permits of feeding positive voltage to the roller 1, and the brushes 2 at each index point value, when perforations indicating elements of recorded data are formed in the columns of the card. Those relays 4 connected to the brushes which are thus energized consequently close their contacts 4*a*. Thus, at each machine point one or more contacts 4*a* may be closed. Two other cam contacts 5 and 6 are adapted, the first to close only between the machine point intervals and consequently to charge a capacitor 7 through a resistor 8 from a source of positive voltage, and the second to close at each machine point, but with a slight retardation with respect to the contact 3, so that the capacitor 7 previously charged is discharged through the resistor 10 and the grid of the electron tube 9, which is normally at sufficient negative voltage through a low resistor 10, passes for a brief time (adjusted by the time constant of the discharge of the capacitor 7 into the resistor 10) to a positive voltage which unblocks the normally blocked electron tube 9. Consequently, a brief negative impulse is produced at the anode of the tube 9 and is transmitted to the line 11 feeding the contacts 4*a*, some of which are closed, as has just been stated.

The terminals of the contacts 4*a* are connected to the line 11 are connected together in series in two groups (namely those corresponding to the columns of even order of the datum and those corresponding to the columns of uneven order) through delay elements 12. These delay elements, in each of the two groups, are so connected that if the record card or tape comprises a number of columns of the group comprising marks registered at the same index value, the corresponding computing device, which will hereinafter be described, successively receives during one machine point an impulse for each of these columns according to their order.

These series connections feed through one of their ends, 13 and 14 respectively for the uneven and even columns, corresponding devices for the calculation of the symbols *Si* and *Sp*. These devices are identical and it is suffcient to describe one of them, for example that shown in the rectangle I in dot-and-dash lines, the device in the rectangle II being assumed to be the same.

It will first be recalled that the single impulse appearing at 11 at each machine point, supplies at 13 as many impulses, spaced in time by the elements 12, as there are contacts 4*a* closed at this machine point for the uneven columns.

The device I comprises an electronic counter having three electronic bi-stable trigger circuits of known type (see for example that described with reference to Figure 1 of U. S. patent application filed July 1, 1950, Serial No. 171,684), which are connected to form a binary chain by means of the links 18 and 19. The first trigger circuit 15 registers the value 1, the second 16 the value 2 and the third 17 the value 4. These trigger circuits 15, 16 and 17 having two stable states or conditions are illustrated in the inoperative condition in the drawing, the hatched upper part of 15, 16 and 17 representing a conductive tube. When the other tube of a trigger circuit is in turn conductive the corresponding trigger circuit is in the so-called operative condition. When a trigger circuit is in its operative condition, it indicates a value registered by an increase of the positive voltage at one of the links 18, 19 and 50. In the drawing, there are shown above each trigger circuit three corresponding contacts 20, 21 and 22 which are adapted to be operated by a cam at each machine point and which can close at the same time as the contacts 4*a*, in accordance with the following law (the values registered in the corresponding trigger circuits being indicated in brackets in the opposite column):

*Table II*

| | | |
|---|---|---|
| At the point 9: | 21 alone | (2) |
| At the point $\bar{8}$: | 20 alone | (1) |
| At the point $\bar{7}$: | none | (0) |
| At the point $\bar{6}$: | 20, 21 and 22 | (1)+(2)+(4) |
| At the point $\bar{5}$: | 21 and 22 | (2)+(4) |
| At the point $\bar{4}$: | 20 and 22 | (1)+(4) |
| At the point $\bar{3}$: | 22 alone | (4) |
| At the point $\bar{2}$: | 20 and 21 | (1)+(2) |
| At the point $\bar{1}$: | 21 alone | (2) |
| At the point $\bar{0}$: | 20 alone | (1) |
| At the points $\overline{11}$, $\overline{12}$, $\overline{13}$, $\overline{14}$: | none. | |

(It is recalled that the card is presented below the brushes in the order of the above points). It will be seen that correspondence has been established with the alphabetic code table given in the foregoing.

Consequently, the impulse set up at 13 produces the admission, into the counter, of a number of impulses representing by their sum, which is produced by the counter, the value of the machine point at the instant. It will be recalled that this sum must be produced, for the points 9, 8, 7 with the base 3, and for the other points $\underline{6}$, $\underline{5}$ . . . $\bar{1}$, $\bar{0}$, $\overline{11}$ with the base 8. This second condition is automatically fulfilled for the points $\underline{6}$ to $\underline{11}$ since the maximum capacity of three trigger circuits is 7.

In the present example, for the points $\underline{9}$, $\underline{8}$ and $\underline{7}$ the first two trigger circuits 15 and 16 are used, one of the combinations of states of equilibrium of these two trigger circuits being rendered unstable, for example the combination (1)+(2) for which a feedback occurs and returns them to the state (0). This feedback is effected by means of a gate of known type having two unidirectional cells 23, 24 connected to the grids of the upper tubes of the trigger circuits, and the common point of which is connected to a negative voltage source through a resistance 25 (or by any gate of known type). When one of the said two trigger circuits passes into the operative condition and the other is already occupying this same condition, or when the two trigger circuits pass simultaneously from the inoperative condition to the operative condition, a negative impulse is applied to at least one of the cells 23, 24 and an impulse is produced which passes through a delay element 26 and a contact actuated by a cam 27 and closed during the points $\underline{9}$, $\underline{8}$ and $\underline{7}$, and returns the trigger 15 and the trigger circuit 16 to zero by means of the carry-over impulse set up by the return of the trigger circuit 15 to the inoperative condition.

The registering or working condition of one of the trigger circuits 15, 16 and 17 is characterised by an increase of positive voltage at one of the links 18, 19 and 50, which are connected to primary relays 28, 29 and 30 sensitive to this increase (gas triodes, gates or any known relays sensitive in this manner) and the energization of the said relay thus permits of closing one of the secondary electromagnetic relays 31 to 35, as will hereinafter be described.

It will be recalled that a device for the calculation of symbols of the type described may be employed in two different apparatus, either as a member for registering the symbol which it calculates on cards whose data have not yet been provided with their symbol, or as a member for checking errors when the cards bear data already provided with their symbol, in order to compare the symbol which it calculates with that already recorded.

The whole device hitherto described is the same in both cases, and it remains to adapt thereto a utilization member which performs one of the aforesaid functions, it being understood that when one of these devices has been provided the other can readily be designed therefrom. It will be assumed for example that the device according to the invention functions as a member for checking errors.

It will also be assumed that the checking is effected by adapting the recording machine to sense the symbol in the cycle succeeding the cycle of the sensing of the data themselves, it being understood that a card is fed through the machine in each "cycle" of points of the machine. Under these conditions, the checking process takes place in the following manner:

During the first part of a first sensing cycle, namely the points $\underline{9}$ to $\underline{7}$ inclusive, a symbol component having the base 3 is calculated, whereafter the cams 36 and 37 close for an instant between the points $\underline{7}$ and $\underline{6}$ and the result is stored in the relays 31, 32, which are held by means of the cam contact 47, which is connected to a voltage source and which closes at this instant, and through contacts 31*a*, 32*a*. Immediately after this, the cam contact 41 closes for a brief instant, whereby a negative impulse is applied to a particular input of each of the trigger circuits 15 and 16 and returns them to the inoperative state. During the following points $\underline{6}$, $\underline{5}$ . . . $\underline{1}$, $\underline{0}$, $\underline{11}$, a second symbol component is calculated on the base 8, whereafter the cam contacts 38, 39, 40 close temporarily, and some of the relays 33 to 35 are energised in accordance with the state of the corresponding trigger circuit and are held by the circuit extending through the cam contact 46, which is closed at this instant, and the holding contacts 33*e*, 34*e*, 35.

When the symbol has been stored in the relays 31 to 35, for example at the point 13 of the cycle, the contact 41 closes again so as to return the trigger circuits 15, 16, 17 to the inoperative condition in order that the symbols of the datum on the following card may be calculated.

The distributor D*r* is connected to a switchboard or change-over switch T, the branches of which depend upon the type of checking to be effected. In the present example the switchboard T and the closures of the contacts 20, 21 and 22 permit of obtaining a checking symbol for a group of letters or figures, in accordance with the code indicated by way of example.

During the second cycle, while the datum on the following card is being sensed and the corresponding symbols are being calculated, the distributor D*r* becomes operative and successively closes its contacts at the points 9, $\underline{8}$, $\underline{7}$, 6, $\underline{5}$ . . . 1, 0, 11 as indicated. Each of the circuits extending from the contact studs of the distributor feeds, through the contacts of the relays 31*b*, 31*c*, 32*b*, 32*c*, 33*a*, 34*a*, 34*b*, 35*a*, 35*b*, 35*c*, 35*d*, connected as shown, the comparison relay 42 while at the same time the relay 43 may be fed through a perforation in the card representing the value of the corresponding symbol. The combinations of contacts 42*a*, 43*a*, actuate in known manner a utilization device U (stopping the machine, for example) in order to reveal the error if any. The second computing device II is identical to the first I and may also actuate the utilization device through its comparison relays 44, 45.

In the circuits shown in the accompanying drawing, which produce the registration combinations of Table II, the impulses supplied by D*r* for all the machine points are directed towards the blades of the relays 31 to 35 indicated in the following table:

*Table III*

| | | |
|---|---|---|
| Point 9: | **32***b*, **31***b* | |
| Point $\bar{8}$: | **32***c*, **31***c* | |
| Point $\bar{7}$: | **32***d*, **31***d* | |
| Point $\bar{6}$: | | **35***a*, **34***a*, **33***a* |
| Point $\bar{5}$: | | **35***c*, **34***b*, **33***a* |
| Point $\bar{4}$: | | **35***b*, **34***a*, **33***a* |
| Point $\bar{3}$: | | **35***d*, **34***b*, **33***a* |
| Point $\bar{2}$: | | **35***a*, **34***a*, **33***a* |
| Point $\bar{1}$: | | **35***c*, **34***b*, **33***a* |
| Point $\bar{0}$: | | **35***b*, **35***a*, **33***a* |
| Point $\overline{11}$: | | **35***d*, **34***b*, **33***a* |

It must here be noted that the blades of the relays 31 to 35 are illustrated on the drawing in their inoperative position, that is to say, in the position in which they are situated when none of these relays is energized. It is also to be noted that the formation of the checking symbol of the relays 31 to 35 affords double safety in almost all cases:

(1) By the energization of the relays 31 to 35 in accordance with the values registered in the trigger circuits 15, 16 and 17 according to the Table II, and (2) By the non-energization of the relays corresponding to the values not registered in the trigger circuits 15, 16 and 17. This double check is effected by an appropriate positioning of the relay contacts in their circuits.

The invention is obviously capable of being carried into effect in various manners based upon the principles hereinbefore set forth and falling within the scope of the present invention. More especially, a saving may be effected in the equipment by using only one of the computing devices, for example I, provided that three sensing brush structures are provided, namely:

A first brush structure for sensing the uneven columns of the datum,

A second brush structure for sensing the even columns of the datum, and the symbols *Si* recorded, and A brush (constituting in itself the third brush structure) for sensing the symbol *Sp*, the cards passing successively below the three brush structures and in this case being fed at the rate of 1 card cycle to 2 machine cycles. A single set of comparison relays (such as 42 and 43 or 44 and 45) is then employed.

I claim:

1. In combination in a record controlled machine: means to sense in parallel marks recorded on index point positions in columns of a record; a network of delay lines for serially distributing among a predetermined number of serial cyclic adders a same number of groups of impulses representing for each value of the index-point position sensed, the ranks of the columns containing marks, storage means to store separately the cyclically accumulated representative values in each of said adders; means to sense said storage means and to control marking means of said machine to record check symbols in a number of distinct columns of said record equal to said predetermined number.

2. In combination in a record controlled machine: means to sense in parallel marks recorded on index point positions in columns of a record; a network of delay lines for serially distributing among a predetermined number of serial cyclic adders a same number of groups of impulses representing for each value of the index-point position sensed, the ranks of the columns containing marks, storage means to store separately the cyclically accumulated representative values in each of said adders; means to sense said storage means and to check said accumulated values against check symbols recorded in a number of distinct colums of said record equal to said predetermined number.

3. In a record controlled machine operatable cyclically, an error-checking arrangement for calculating at least two checking symbols from a composite datum recorded in a plurality of columns as marks positioned differently according to a two-position combinational code, one of said symbols being related to a group of odd columns and the second one being related to a group of even columns, comprising in combination a sensing device for reading marks having a plurality of electromagnetic relays controlling each a contact and being connected in a columnar relationship to reading members so that one or more of said relay contacts may be momentarily closed at each reading point of cycle in accordance with the columns containing the mark, or marks read, a pulse emitting device cyclically operated to supply said relay contacts with a pulse at each reading point of cycle, two groups of connections including delay networks, each group having a common lead and being associated to some of said relay contacts corresponding to one of said groups of columns for deriving at each reading point of cycle one or more differently delayed pulses in accordance with the contacts closed at this point, two calculating devices, each device comprising a counting unit for accumulating pulses without any carry-over over a base value *n*, including several bi-stable trigger circuits assigned to binary values and having each an input to receive pulses, first switching means cyclically operated for directing said delayed pulses from the said common lead of an associated one of said groups of connections to said trigger inputs in combinations differing according to the points of cycle during which the marks are read, cyclically operated resetting means for controlling said counting unit to cause the latter to operate in two separate phases in one cycle, a first storage relay device, second switching means cyclically operated to control said first storage relay device so that said device will store a first symbol component calculated during a first phase on a base value lesser than *n* by said counting unit, a second storage relay device, third switching means cyclically operated to control said second storage relay device so that said device will store a second symbol component calculated on the said base value *n* by said counting unit during a second phase in the same cycle.

4. In a record card controlled machine operatable cyclically, an error-checking arrangement for calculating a checking symbol from a composite data recorded in a plurality of card columns as marks positioned differently according to a two-position combinational code, this arrangement comprising in combination a mark analyzing device with a plurality of reading relays controlling each a contact and being connected in a columnar relationship to reading members so that at each reading point of cycle one or more of said contacts will be closed in accordance with the columns containing the mark or marks read, a counting unit for accumulating pulses without any carry-over over a value *n*, comprising several bi-stable trigger circuits assigned to binary values and having each an input to receive pulses, first cyclically operated switches separately connected to the inputs of said trigger circuits and having a common lead, connections including delay networks and connected between said contacts and said common lead for deriving at each reading point of cycle one or more differently delayed pulses according to the contacts closed at this point, the closure times of said switches being such that said derived pulses are directed to different combinations of inputs of said trigger circuits in relation to said combinational code, and circuit control means operating cyclically for controlling said counting unit to cause the latter to operate in two phases in the course of one cycle, one phase to calculate a first symbol component and the other phase to calculate a second symbol component.

References Cited in the file of this patent

UNITED STATES PATENTS 1,283,293 Poole ------------------ Oct. 29, 1918